United States Patent [19]
Balling

[11] Patent Number: 5,828,914
[45] Date of Patent: Oct. 27, 1998

[54] CAMERA WITH VARIABLE FORMAT VIEWFINDER

[75] Inventor: Edward N. Balling, Rochester, N.Y.

[73] Assignee: Eastman Kodak Company, Rochester, N.Y.

[21] Appl. No.: 876,934

[22] Filed: Jun. 16, 1997

[51] Int. Cl.$^6$ .................................................. G03B 13/10
[52] U.S. Cl. ........................ 396/378; 396/380; 396/435
[58] Field of Search .................................. 396/378, 379, 396/380, 435, 436

[56] References Cited

U.S. PATENT DOCUMENTS

| | | | |
|---|---|---|---|
| 2,542,939 | 2/1951 | Cisski | 396/378 |
| 2,552,940 | 5/1951 | Cornut | 396/378 |
| 3,118,014 | 1/1964 | Winkler | 396/378 |
| 4,973,997 | 11/1990 | Harvey | 396/315 |
| 5,430,517 | 7/1995 | Zander | 396/378 |
| 5,471,265 | 11/1995 | Shibata et al. | 396/311 |
| 5,530,510 | 6/1996 | Alligood | 396/380 |
| 5,555,058 | 9/1996 | Huang et al. | 396/378 |
| 5,689,743 | 11/1997 | Horning et al. | 396/316 |

*Primary Examiner*—Eddie C. Lee
*Attorney, Agent, or Firm*—Roger A. Fields

[57] ABSTRACT

A camera comprising a pair of front and rear viewfinder openings with a similar aspect ratio which defines a field of view through the front and rear viewfinder openings, and a masking device having a front masking opening with an aspect ratio that is different than the aspect ratio of the front and rear viewfinder openings and being supported to be positioned over the front viewfinder opening to change the field of view through the front and rear viewfinder openings, is characterized in that the masking device has a rear masking opening with the same aspect ratio as the front masking opening and being connected to the front masking opening to be positioned over the rear viewfinder opening when the front masking opening is positioned over the front viewfinder opening. Preferably, the masking device includes an endless masking belt having the pair of front and rear masking openings.

8 Claims, 7 Drawing Sheets

CAMERA WITH VARIABLE FORMAT VIEWFINDER

FIELD OF THE INVENTION

The invention relates generally to the field of photography, and in particular to cameras. More specifically, the invention relates to a camera with an adjustable framing or masking device for changing the format, i.e. aspect ratio (height×width), of the field of view through the viewfinder.

BACKGROUND OF THE INVENTION

Cameras in the recently introduced "Advanced Photo System" give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice magnetically and/or optically on the filmstrip. The photofinisher's equipment then reads this data, and automatically prints each print in the selected format. A "C" format print is typically 4×6 inches. An "H" format print is typically 4×7 inches. And a "P" format print is typically 4×10 inches or 4×11.5 inches.

No matter which format is chosen in the camera, the exposed image areas on the filmstrip are always in the "H" format. This allows reprints to be made in any of the different formats. However, in order for the photographer to know how much of the subject will be included in the print, the viewfinder in the camera includes an adjustable masking device for framing the subject according to the selected format.

Typically, the camera comprises pair of front and rear viewfinder openings with a similar aspect ratio which defines a field of view through the front and rear viewfinder openings, and a masking device having a front masking opening with an aspect ratio that is different than the aspect ratio of the front and rear viewfinder openings. The masking device is supported to be positioned over the front viewfinder opening to change the field of view through the front and rear viewfinder openings. See prior art U.S. Pat. No. 4,973,997 issued Nov. 27, 1990 and No. 5,430,517 issued Jul. 4, 1995.

SUMMARY OF THE INVENTION

According to one aspect of the invention, a camera comprising a pair of front and rear viewfinder openings with a similar aspect ratio which defines a field of view through the front and rear viewfinder openings, and a masking device having a front masking opening with an aspect ratio that is different than the aspect ratio of the front and rear viewfinder openings and being supported to be positioned over the front viewfinder opening to change the field of view through the front and rear viewfinder openings, is characterized in that:

the masking device has a rear masking opening with the same aspect ratio as the front masking opening and being connected to the front masking opening to be positioned over the rear viewfinder opening when the front masking opening is positioned over the front viewfinder opening.

According to another aspect of the invention, a viewfinder for a camera comprises:

an endless belt having a pair of spaced front and rear viewfinder openings with a similar aspect ratio and being supported for movement to align the front and rear viewfinder openings to define a field of view through the front and rear viewfinder openings.

DETAILED DESCRIPTION OF THE INVENTION

The invention is disclosed as being embodied preferably in a camera with a variable format viewfinder. Because the features of a camera with a variable format viewfinder are generally known, the description which follows is directed in particular only to those elements forming part of or cooperating directly with the disclosed embodiment. It is to be understood, however, that other elements may take various forms known to a person of ordinary skill in the art.

Figure 1:
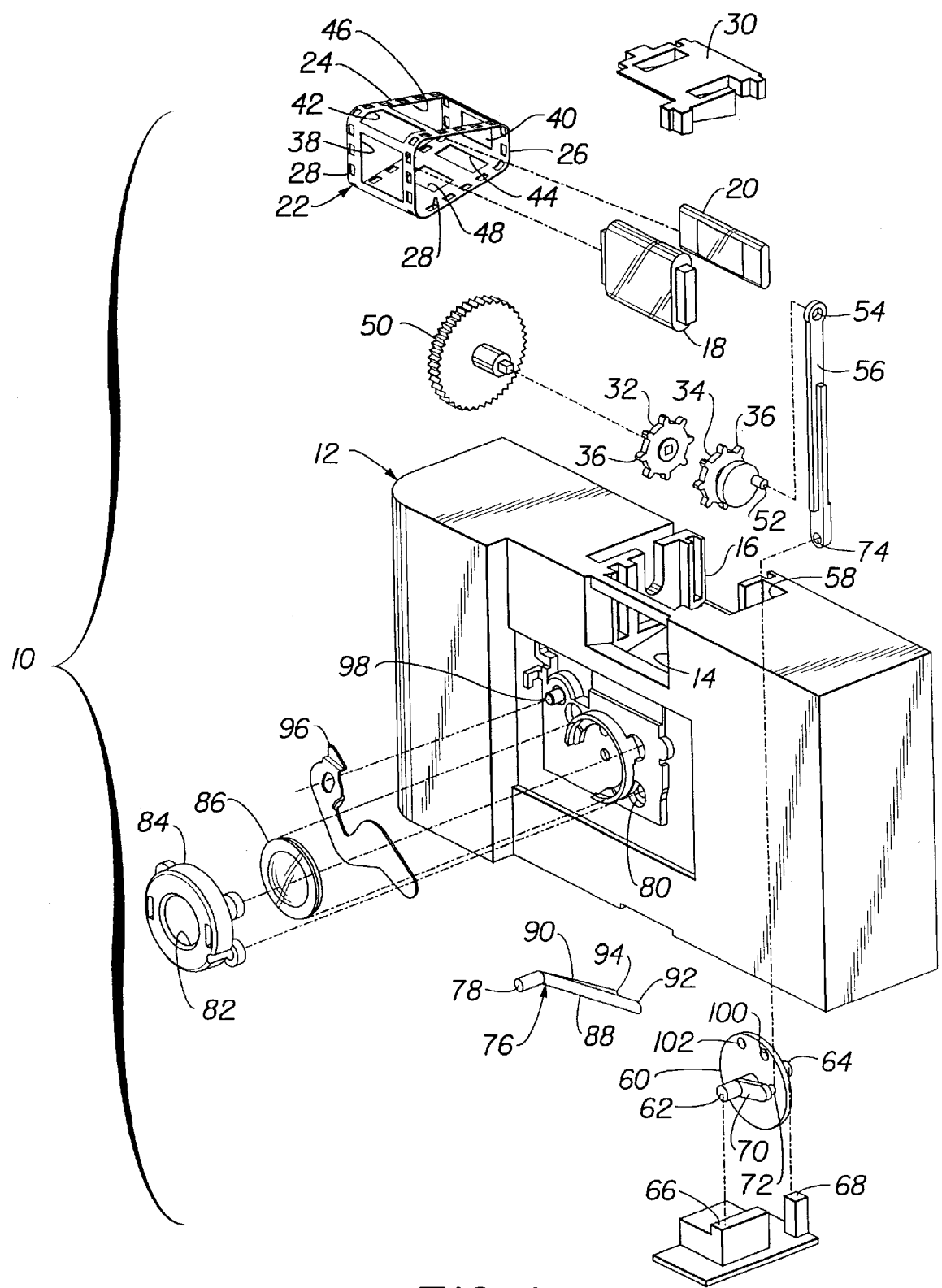
FIG. 1 is an exploded perspective view of a camera with a variable format viewfinder pursuant to a preferred embodiment of the invention.
Figure 2:
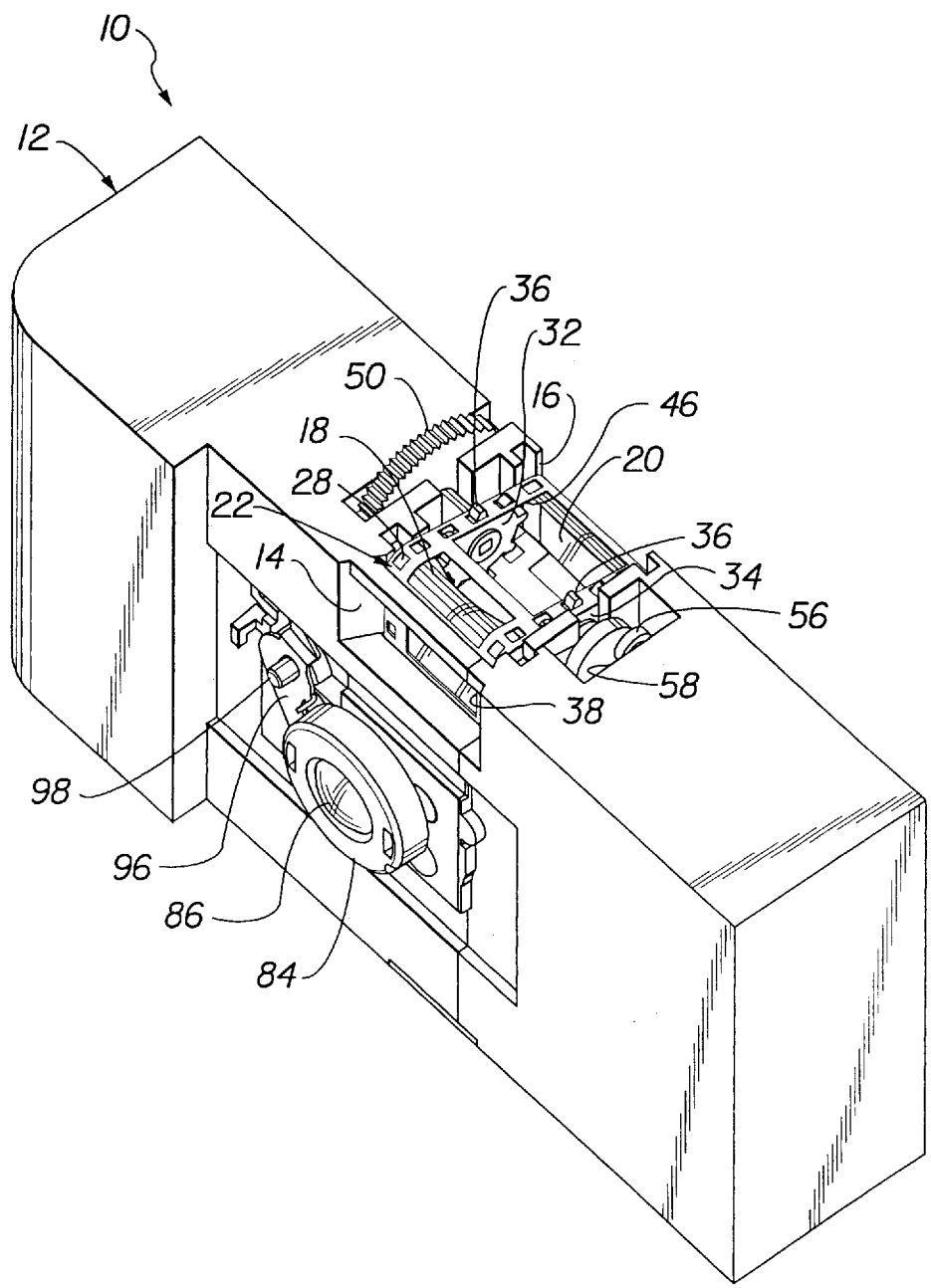
FIG. 2 is an assembled perspective view of the camera.

Referring now to the drawings, FIGS. 1 and 2 show a camera 10 including a main body part 12. The main body part 12 has a pair of larger-front and smaller-rear aligned viewfinder openings 14 and 16 with a similar aspect ratio. A pair of front and rear viewfinder lenses 18 and 20 are positioned behind the front and rear viewfinder openings 14 and 16. An endless masking belt 22 extends between the front viewfinder opening 14 and the front viewfinder lens 18 and between the rear viewfinder opening 16 and the rear viewfinder lens 20. The endless masking belt 22 has a pair of parallel longitudinal edges 24 and 26 and respective series of perforations 28 inwardly adjacent the longitudinal edges. A top retaining plate 30 covers the endless masking belt 22. A pair of coaxial sprocket wheels 32 and 34 have respective teeth 36 for engaging the endless masking belt 22 at its perforations 28 and are rotatable to effect movement of the endless masking belt.

Figure 3:
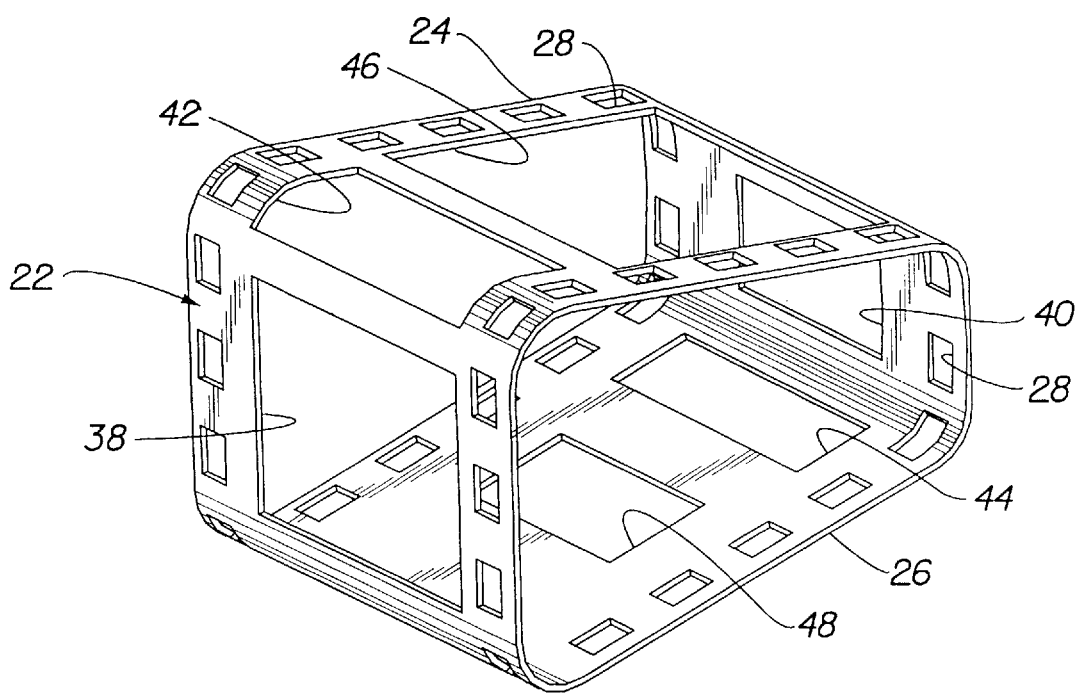
FIG. 3 is a front perspective view of an endless masking belt of the variable format viewfinder.

As shown in FIG. 3, the endless masking belt 22 has three pairs of front and rear masking openings 38 and 40, 42 and 44, and 46 and 48. One pair of front and rear masking openings 38 and 40 have a known standard "C" format, i.e. classic, aspect ratio. Another pair of front and rear masking openings 42 and 44 have a known standard "P" format, i.e. panoramic, aspect ratio. And a third pair of front and rear masking openings 46 and 48 have a known standard "H" format, i.e. almost full-frame, aspect ratio. The "C" format, "P" format and "H" format pairs of the front and rear masking openings 38 and 40, 42 and 44, and 46 and 48 are interspersed on the endless masking belt to locate the respective front masking openings 38, 42 and 46 in immediate succession followed by the respective rear masking openings 40, 44 and 48 in immediate succession.

Figure 6:
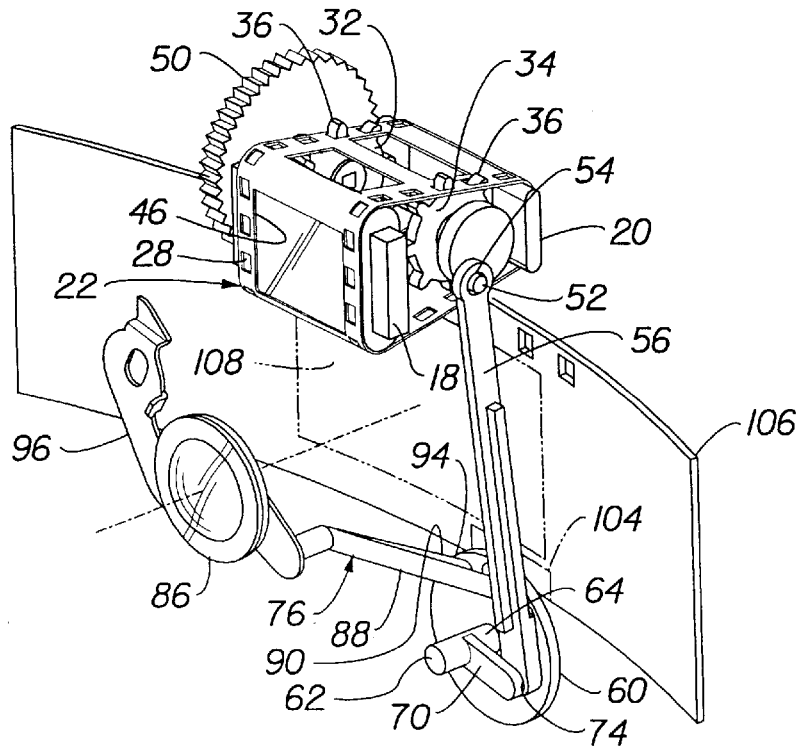
FIG. 6 is a front perspective view of the variable format viewfinder and the associated format encoder, showing the viewfinder and encoder when the "H" format is chosen and the shutter is closed.
Figure 7:
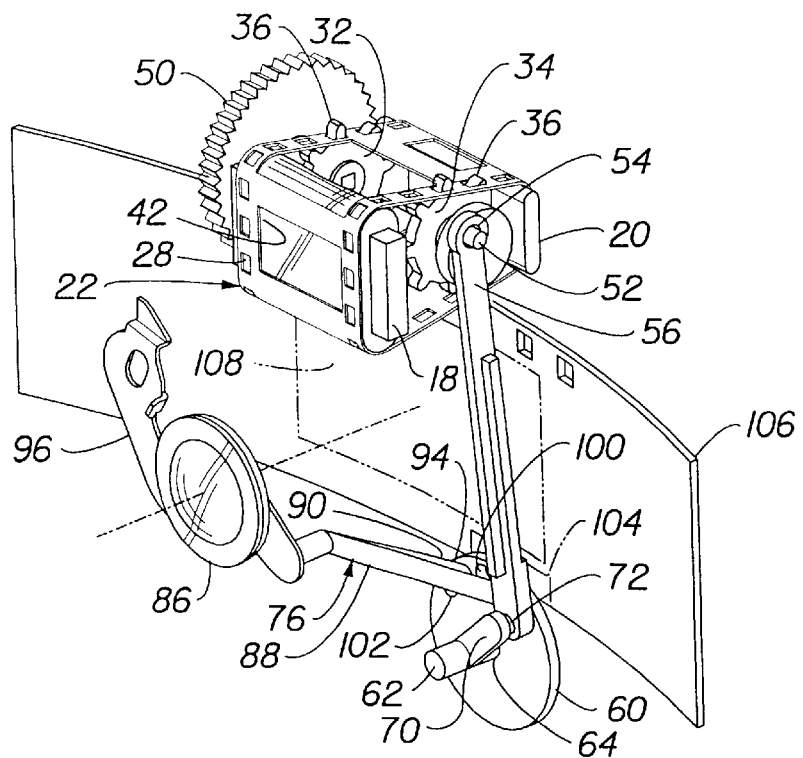
FIG. 7 is a front perspective view of the variable format viewfinder and the associated format encoder, showing the viewfinder and encoder when the "P" format is chosen and the shutter is closed.

A manual selector knob 50 is coaxially connected to the sprocket wheel 32 to be rotated to rotate that sprocket wheel to move the endless masking belt 22 and in turn rotate the sprocket wheel 34. Known stop means, not shown, limits rotation of the selector knob 187 degrees in opposite directions. The selector knob 50 is rotated to position anyone of the "C" format, "P" format and "H" format pairs of front and rear masking openings 38 and 40, 42 and 44 and 46 and 48 between the front viewfinder opening 14 and the front viewfinder lens 18 and between the rear viewfinder opening 16 and the rear viewfinder lens 20 to change the field of view through the front and rear viewfinder lenses 18 and 20 and the front and rear viewfinder openings 14 and 16. FIGS. 1, 2, 4 and 5 show the selector knob 50 rotated to position the "C" format pair of front and rear masking openings 38 and 40 between the front viewfinder opening 14 and the front viewfinder lens 18 and between the rear viewfinder opening 16 and the rear viewfinder lens 20. FIG. 7 shows the selector knob 50 rotated to position the "P" format pair of front and rear masking openings 42 and 44 between the front viewfinder opening 14 and the front viewfinder lens 18 and between the rear viewfinder opening 16 and the rear viewfinder lens 20. And FIG. 6 shows the selector knob 50 rotated to position the "HH" format pair of front and rear masking openings 46 and 48 between the front viewfinder opening 14 and the front viewfinder lens 18 and between the rear viewfinder opening 16 and the rear viewfinder lens 20.

The sprocket wheel 34 has an eccentric pin 52 that is rotatable within a top hole 54 in a reciprocating arm 56, which is movably supported within a slot 58 in the main body part 12. See FIGS. 1 and 4–7. An encodement disk 60 has a pair of coaxial shaft ends 62 and 64 rotatably supported on bearing supports 66 and 68 and a radial arm 70 with an eccentric pin 72 rotatable within a bottom hole 74 in the reciprocating arm 56. An optical light pipe 76 has a forward end 78 fixed within an opening 80 in the main body part 12, to face an ambient light ingress opening 82 in a lens retainer 84 for a taking lens 86, and a pair of legs 88 and 90 whose respective rear ends 92 and 94 face the encodement disk 60. A shutter blade 96 is pivotally supported on a pin 98 on the main body part 12 for opening movement to uncover the taking lens 86 and the forward end 78 of the optical pipe 76 and for closing movement to re-cover the taking lens and the forward end of the optical pipe.

Operation

Figure 4:
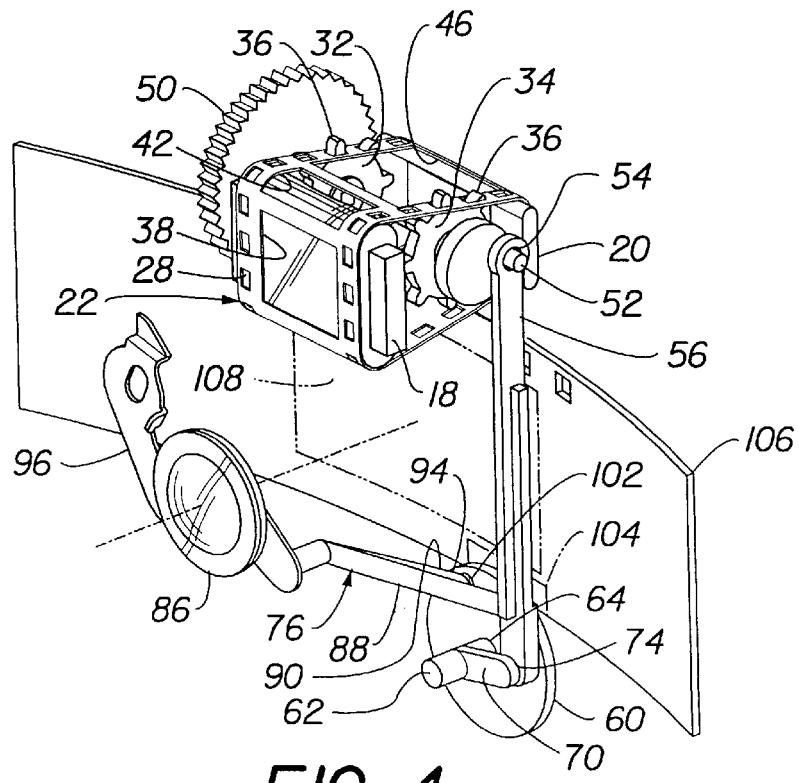
FIG. 4 is a front perspective view of the variable format viewfinder and an associated format encoder, showing the viewfinder and encoder when the "C" format is chosen and the shutter is closed.
Figure 5:
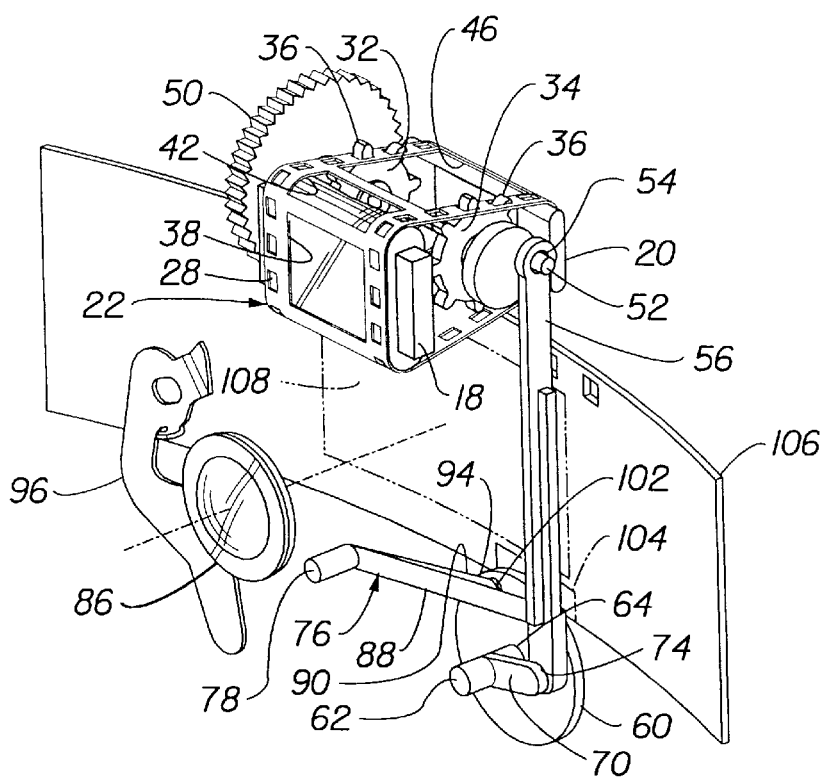
FIG. 5 is a front perspective view of the variable format viewfinder and the associated format encoder, showing the viewfinder and encoder when the "C" format is chosen and the shutter is opened.
Figure 9:
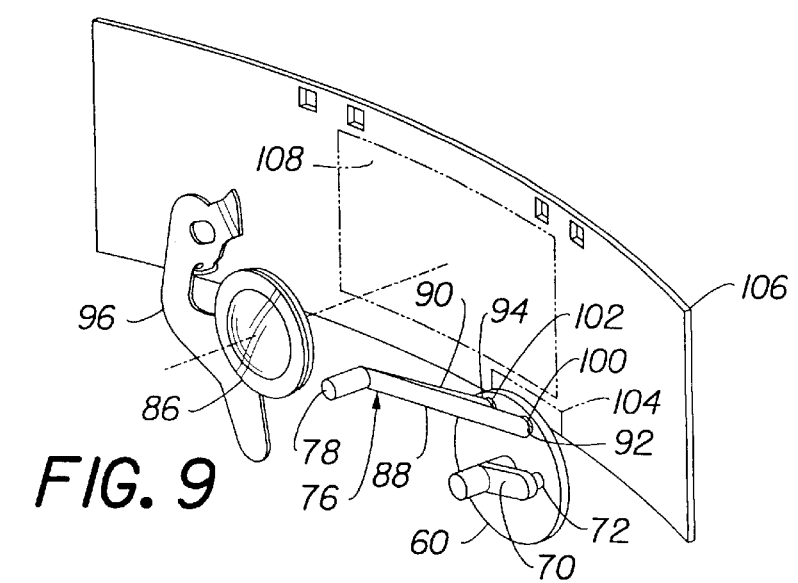
FIG. 9 is a front perspective view of the format encoder, showing the encoder when the "C" format is chosen and the shutter is open.

Beginning with FIGS. 4, 5 and 9, when the selector knob 50 is rotated to position the "C" format pair of front and rear masking openings 38 and 40 of the endless masking belt 22 between the front viewfinder opening 14 and the front viewfinder lens 18 and between the rear viewfinder opening 16 and the rear viewfinder lens 20, the encodement disk 60 is rotated to position respective holes 100 and 102 adjacent the rear ends 92 and 94 of the optical light pipe 76. Consequently, when the shutter blade 96 is pivoted open, the forward end 78 of the optical light pipe 76 is uncovered to allow ambient light to be conducted via the optical light pipe to an encodement area 104 on a filmstrip 106, to expose an optical binary encodement "1, 1" on the encodement area. The encodement area 104 is located adjacent an exposed image area 108 on the filmstrip 106, which is effected by opening the shutter blade 96. See FIGS. 5 and 9.

Figure 8:
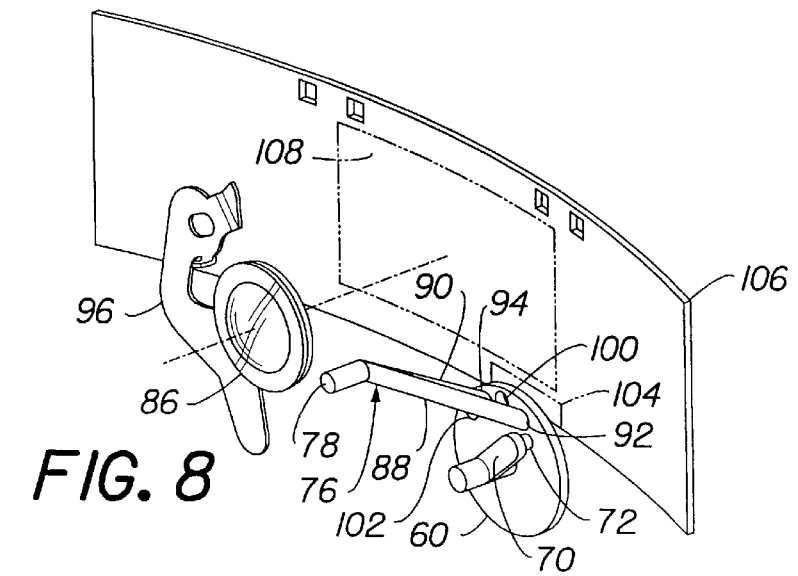
FIG. 8 is a front perspective view of the format encoder, showing the encoder when the "P" format is chosen and the shutter is open.

As shown in FIGS. 7 and 8, when the selector knob 50 rotated to position the "P" format pair of front and rear masking openings 42 and 44 of the endless masking belt 22 between the front viewfinder opening 14 and the front viewfinder lens 18 and between the rear viewfinder opening 16 and the rear viewfinder lens 20, the encodement disk 60 is rotated to position only the hole 100 adjacent the rear end 94 of the optical light pipe 76. Consequently, when the shutter blade 96 is pivoted open, the forward end 78 of the optical light pipe 76 is uncovered to allow ambient light to be conducted via the optical light pipe to the encodement area 104 on the filmstrip 106, to expose an optical binary encodement "1, 0" on the encodement area.

Figure 10:
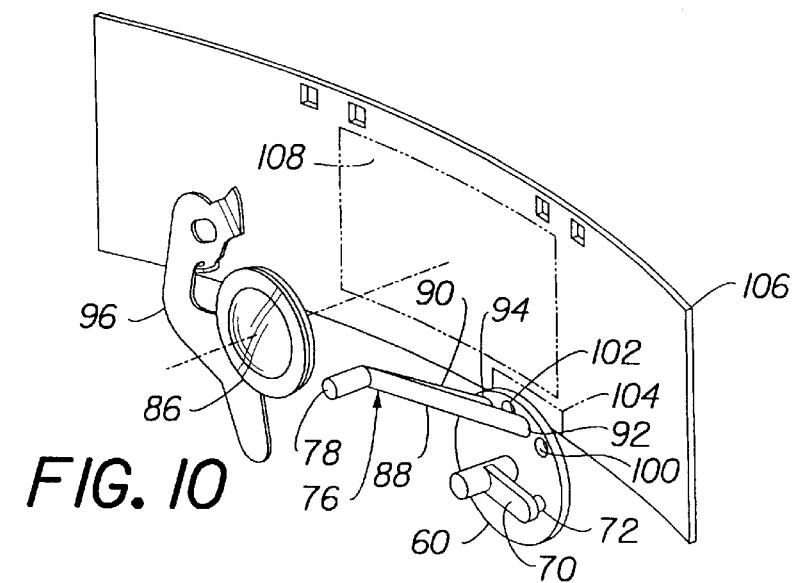
FIG. 10 is a front perspective view of the format encoder, showing the encoder when the "H" format is chosen and the shutter is open.

As shown in FIGS. 6 and 10, when the selector knob 50 rotated to position the "H" format pair of front and rear masking openings 46 and 48 of the endless masking belt 22 between the front viewfinder opening 14 and the front viewfinder lens 18 and between the rear viewfinder opening 16 and the rear viewfinder lens 20, the encodement disk 58 is rotated to position neither of the holes 100 and 102 adjacent the rear ends 92 and 94 of the optical light pipe 76. Consequently, when the shutter blade 96 is pivoted open, although the forward end 78 of the optical light pipe 76 is uncovered to allow ambient light to be conducted via the optical light pipe to the rear ends 92 and 94 of the optical light pipe 76, the encodement disk 60 blocks the light from reaching the encodement area 104 on the filmstrip 106. This provides an optical binary encodement "0, 0" on the encodement area 104.

Figure 11:
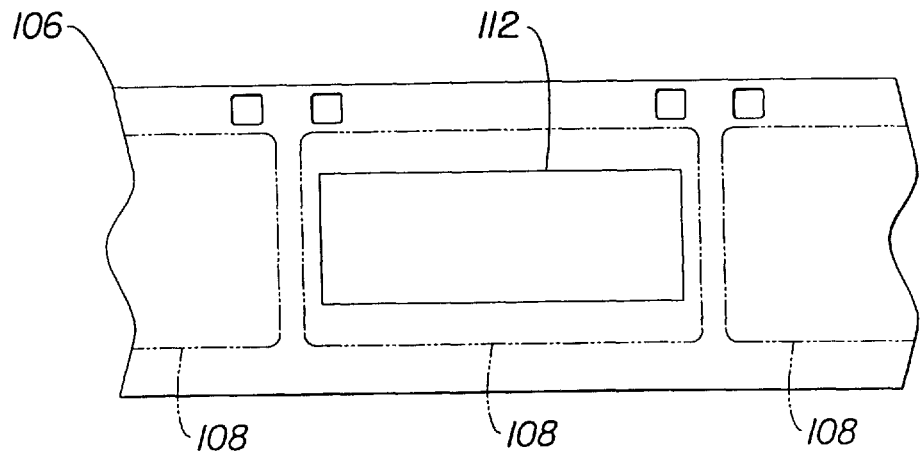
FIG. 11 is a plan view of a filmstrip indicating the exposed image area and a "P" format printed image area.
Figure 12:
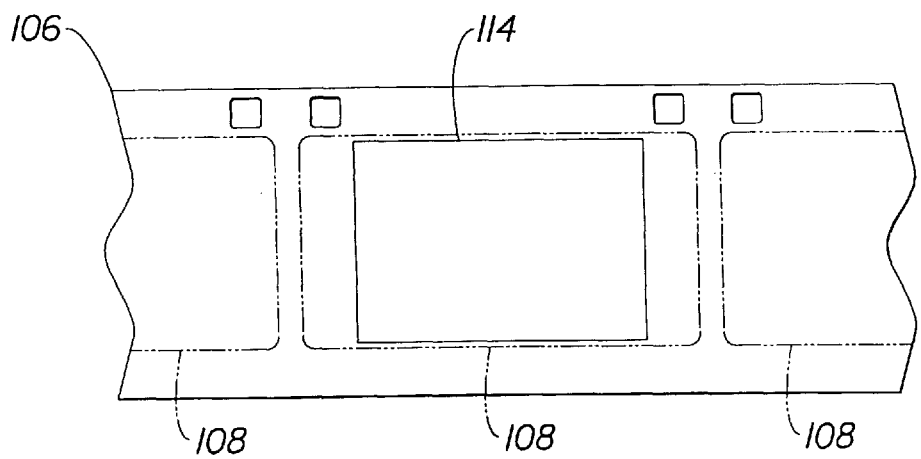
FIG. 12 is a plan view of the filmstrip indicating the exposed image area and a "C" format printed image area.
Figure 13:
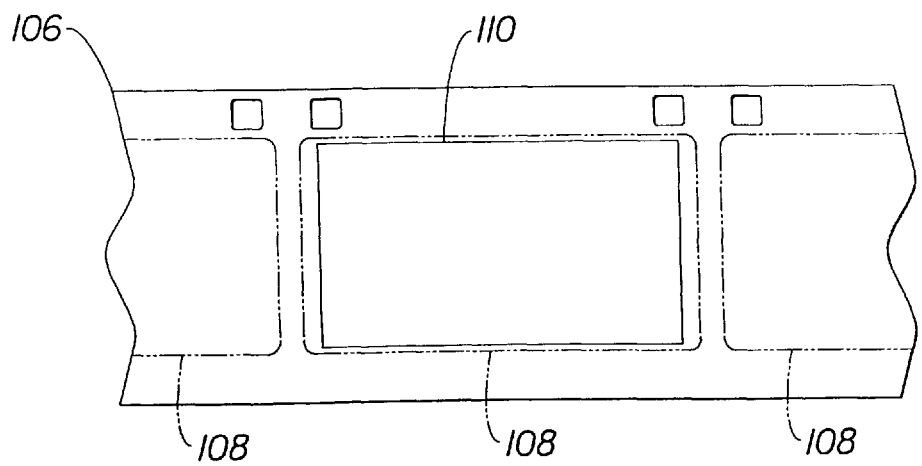
FIG. 13 is a plan view of the filmstrip indicating the exposed image area and a "H" format printed image area.

No matter which one of the "C", "P" or "H" formats is chosen, the exposed image area 108 on the filmstrip 106 is substantially close to the "H" format. This allows reprints to be made in any of the different formats. See FIG. 13, which shows the filmstrip 106 with the exposed image area 108 and with a superimposed print image area 110 in the "H" format. See FIG. 11, which shows the filmstrip 106 with the exposed image area 108 and with a superimposed print image area 112 in the "P" format. And see FIG. 12, which shows the filmstrip 106 with the exposed image area 108 and with a superimposed print image area 114 in the "C" format.

The invention has been described with reference to a preferred embodiment. However, it will be appreciated that variations and modifications can be effected by a person of ordinary skill in the art without departing from the scope of the invention.

PARTS LIST 10. camera
12. main body part
14. front viewfinder opening
16. rear viewfinder opening
18. front viewfinder lens 20. rear viewfinder lens
22. endless masking belt
24. belt longitudinal edge
26. belt longitudinal edge
28. belt perforations
30. top retaining plate
32. sprocket wheel
34. sprocket wheel
36. sprocket teeth
38. "C" front masking opening
40. "C" rear masking opening
42. "P" front masking opening
44. "P" rear masking opening P
46. "H" front masking opening
48. "H" rear masking opening
50. selector knob
52. eccentric pin
54. top arm hole
56. reciprocating arm
58. slot
60. encodement disk
62. shaft end
64. shaft end
66. bearing support
68. bearing support
70. radial arm
72. eccentric pin
74. bottom arm hole
76. optical light pipe
78. forward end
80. opening
82. ambient light ingress opening
84. lens retainer
86. taking lens
88. leg
90. leg
92. rear end
94. rear end
96. shutter blade
98. pin
100. disk hole
102. disk hole
104. encodement area
106. filmstrip
108. exposed image area
110. "H" format print image area
112. "P" format print image area
114. "C" format print image area

What is claimed is:

1. A camera comprising a pair of front and rear viewfinder openings with a similar aspect ratio which defines a field of view through said front and rear viewfinder openings, a pair of front and rear viewfinder lenses positioned at said front and rear viewfinder openings, and a masking device having a front and rear masking openings with a similar aspect ratio that is different than the aspect ratio of said front and rear viewfinder openings and being supported to be positioned over said front and rear viewfinder openings to change the field of view through the front and rear viewfinder openings, is characterized in that:

said masking device is an endless masking belt having said front and rear masking openings and extends between said front viewfinder opening and said front viewfinder lens and between said rear viewfinder opening and said rear viewfinder lens to partially occlude the lenses.

2. A camera as recited in claim 1, wherein said endless masking belt has a pair of longitudinal edges and respective series of perforations adjacent said longitudinal edges and a pair of coaxial sprocket wheels have respective teeth for engaging said endless masking belt at said perforations and are rotatable to effect movement of the endless masking belt to position said front and rear masking openings over said front and rear viewfinder openings.

3. A camera as recited in claim 2, wherein a manual selector knob is coaxially connected to one of said sprocket wheels to be rotated to rotate that sprocket wheel to move said endless masking belt and in turn rotate the other sprocket wheel.

4. A camera as recited in claim 3, wherein an encodement disk is rotatable to provide a film encodement corresponding to the aspect ratio of said front and rear masking openings, and said other sprocket wheel is connected to said encodement disk to rotate the encodement disk when the other sprocket wheel is rotated.

5. A camera as recited in claim 4, wherein a reciprocating arm is rotatably coupled at one end with an eccentric pin on said other sprocket wheel and at another end with an eccentric pin on said encodement disk to effect rotation of the encodement disk in response to rotation of the other sprocket wheel.

6. A viewfinder for a camera comprising:

a movable flexible endless belt having a first pair of spaced front and rear viewfinder openings with a similar aspect ratio that defines a field of view when said first pair of front and rear viewfinder openings are aligned and a second pair of spaced front and rear viewfinder openings with a similar aspect ratio which is different than the aspect ratio of said first pair of front and rear viewfinder openings to change the field of view when said second pair of front and rear viewfinder openings are aligned in place of said first pair of front and rear viewfinder openings being aligned;

a wheel engaging said endless belt and rotatable to move the endless belt; and a encodement disk rotatable to provide a film encodement corresponding to the aspect ratio of the particular pair of front and rear viewfinder openings that are aligned and connected to said wheel to be rotated when the wheel is rotated to move the endless belt.

7. A viewfinder as recited in claim 6, wherein said first and second pairs of front and rear viewfinder openings are interspersed on said endless belt to locate the respective front viewfinder openings of the first and second pairs in succession followed by the respective rear viewfinder openings of the first and second pairs in succession.

8. A viewfinder as recited in claim 6, wherein a manual selector knob in engagement with said wheel is rotatable in respective directions to align said first pair of front and rear viewfinder openings or said second pair of front and rear viewfinder openings.

* * * * *